UNITED STATES PATENT OFFICE.

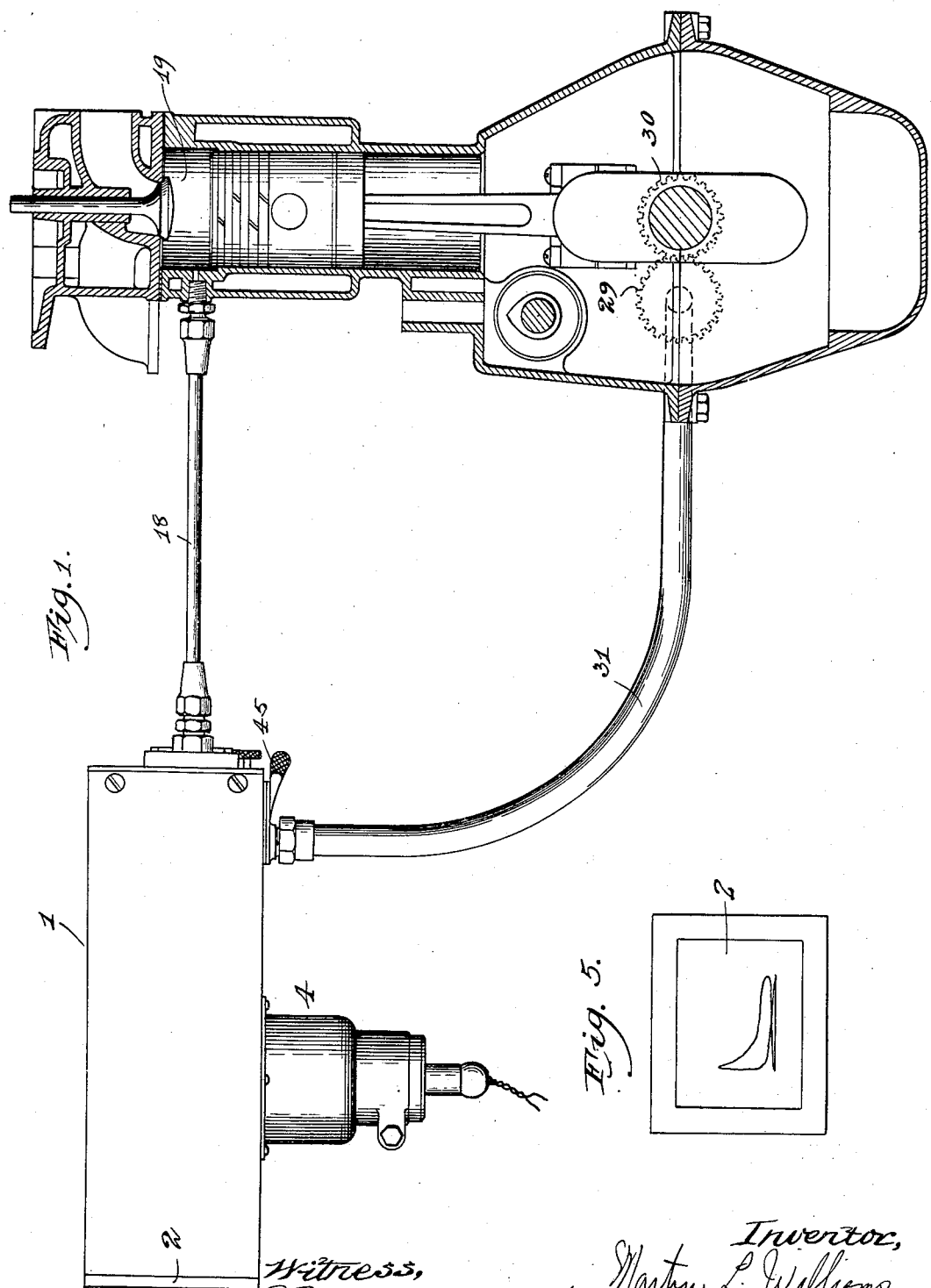

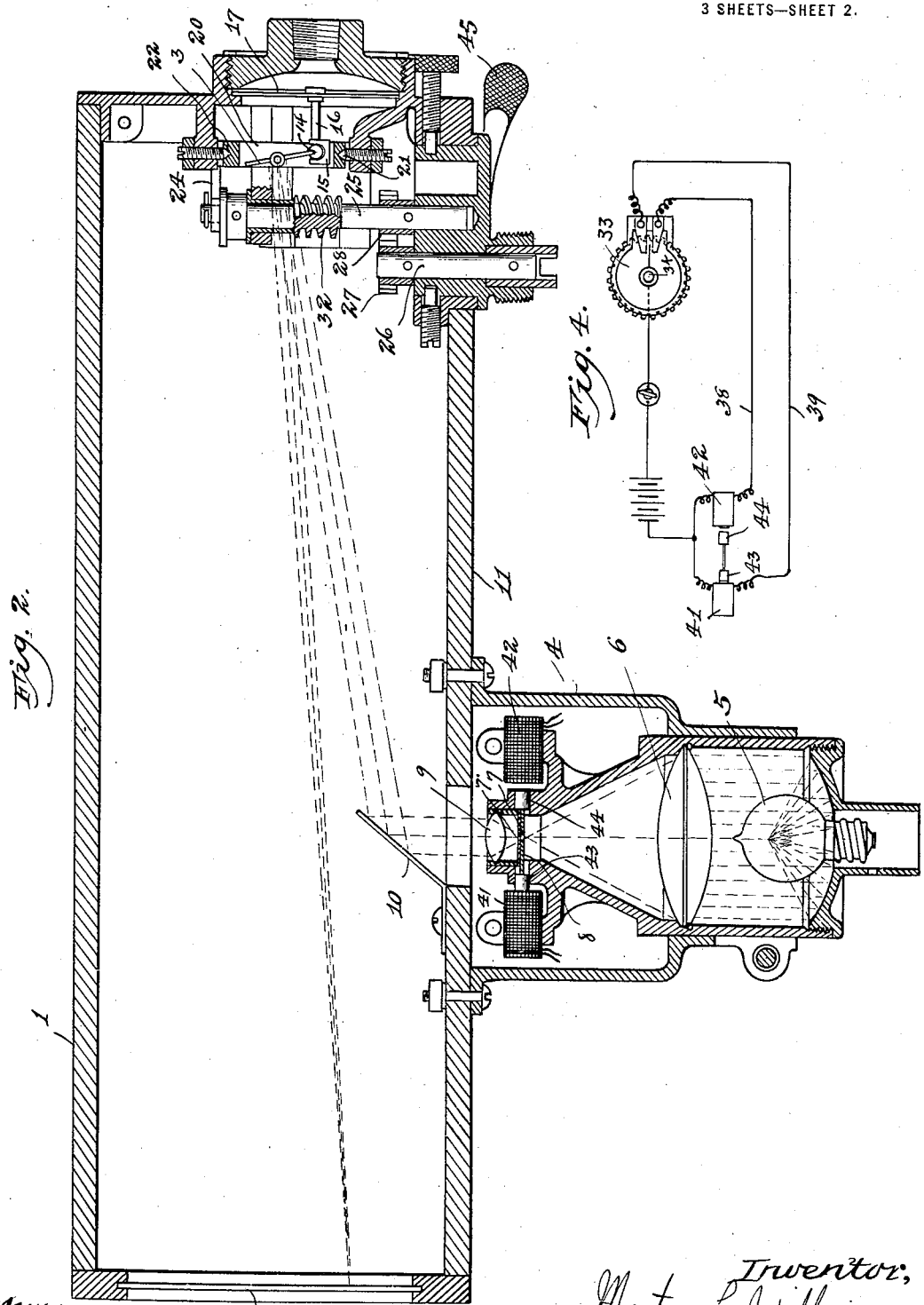

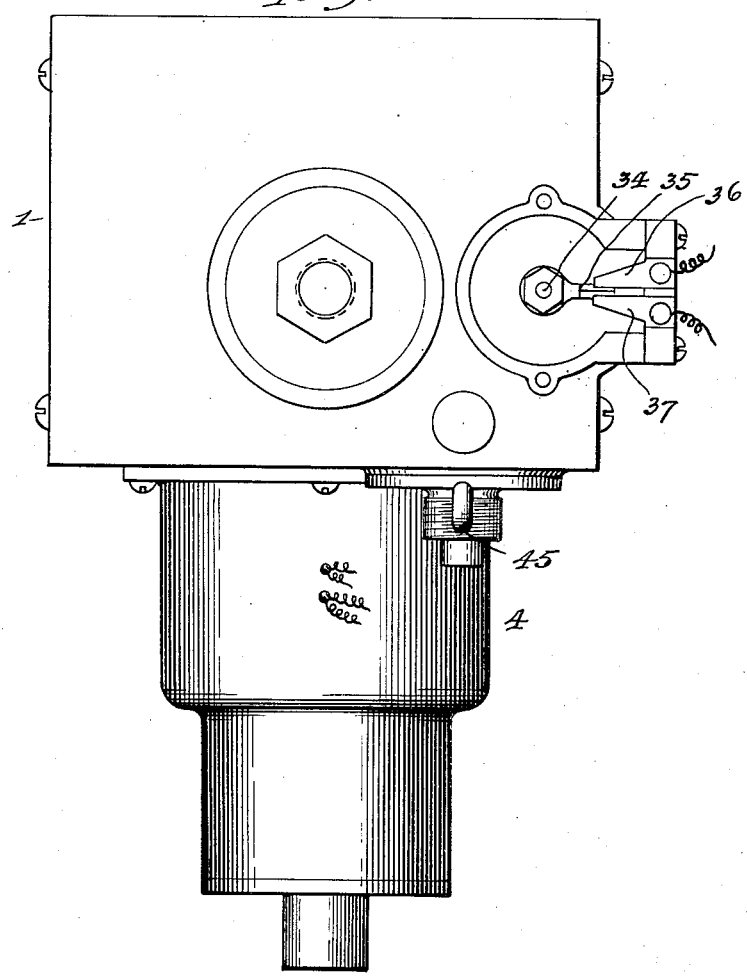
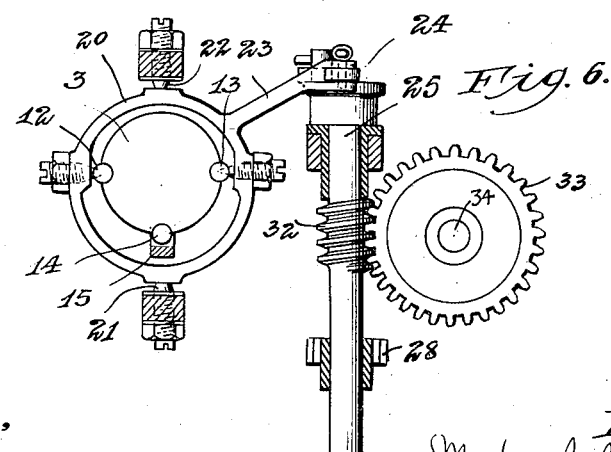

MARTIN L. WILLIAMS, OF SOUTH BEND, INDIANA, ASSIGNOR, BY MESNE ASSIGNMENTS, TO AMERICAN SLEEVE-VALVE MOTOR COMPANY, A CORPORATION OF DELAWARE.

TESTING DEVICE FOR ENGINES.

1,323,209.            Specification of Letters Patent.     Patented Nov. 25, 1919.

Application filed August 25, 1915, Serial No. 47,270. Renewed October 17, 1919. Serial No. 331,506.

*To all whom it may concern:*

Be it known that I, MARTIN L. WILLIAMS, a citizen of the United States, residing in South Bend, county of St. Joseph, and State of Indiana, have invented certain new and useful Improvements in Testing Devices for Engines, of which the following is a specification.

This invention relates to testing device for engines and more particularly to a device for indicating or recording the efficiency of the various cylinders of an internal combustion engine, though in its broader aspects, the invention is not limited to the particular use specified.

Among the salient objects of the invention are to provide a construction by which the individual power impulses can be measured; to provide a construction in which the movement of the indicating screen is so enlarged that any discrepancies can be detected; to provide a construction in which a record can be kept of the tests of any cylinder; to provide a construction in which reflected rays of light are employed for indicating the movement of the diaphragm, thus permitting a record to be made on an ordinary photographic plate without the employment of extraneous devices; to provide a construction in which the reflected mirror is subjected to movements in transverse planes whereby a comparative chart can be obtained; to provide a construction which can readily be connected up to a cylinder of an internal combustion engine such as are used in automobiles and the like; to provide a device which is simple in construction, positive in action, and which can be economically employed for testing automobile and other engines; and in general to provide an improved device of the character referred to.

In the drawings:

Figure 1 is a side elevation partly in section showing a device embodying my invention in use with an internal combustion engine.

Fig. 2 is an enlarged vertical cross section through the testing device.

Fig. 3 is an end elevation of the mechanism shown in Fig. 2.

Fig. 4 is a diagrammatic view of the electrical control.

Fig. 5 is a view of one of the records made by the device.

Fig. 6 is an enlarged fragmentary section through the adjusting mechanism.

Referring in detail to the particular embodiment of my invention shown in the drawings, 1 designates a casing having at one end a screen or sensitive plate 2, and provided near its opposite end with a movable mirror 3. At its lower side the casing 2 has connected thereto an auxiliary casing 4, within which is located a suitable source of light such as the electric light bulb 5. The rays from this source of light pass first through a double convex lens 6, which is so positioned that the rays of light are focused on an opening 7 formed in the plate 8. The rays of light passing through this opening diverge onto a smaller double convex lens 9, from which they are projected in substantially parallel rays to a mirror or reflector 10. This mirror is mounted to extend in angular relation to the wall 11 of the casing, the angle being such that from the reflector 10, the rays of light will be reflected onto the mirror 3. From here they are reflected back onto the screen or sensitive plate 2, and the path of the ray of light so reflected is used for indicating or recording the efficiency of the engine in the following manner:

As shown in detail in Fig. 6, the mirror 3 is supported at its sides by pivot points 12 and 13, and at its lower end is connected to a ball 14, engaging a socket 15, which is carried by an arm 16. The latter is fixedly secured to a diaphragm 17, this diaphragm being connected by means of a conduit 18 into open communication with the chamber 19. The mounting of the mirror 3 with relation to the diaphragm is such that as the pressure in the cylinder chamber increases and decreases, the diaphragm will move back and forth carrying with it the arm 16 and rock the arm about a horizontal axis extending through the pivots 12 and 13.

In addition to the mounting above described the frame 20 which carries the pivot points 12 and 13 is itself mounted on pivot points 21 and 22, which form a vertical axis about which the frame 20 is oscillated, by the following mechanism: From the upper portion of the frame 20, there extends an arm 23, which is connected to an eccentric 24 mounted at the upper end of a vertical shaft 25. This shaft is driven from a shaft 26 by means of intermeshing gears 27 and 28, the shaft 26 being connected by a flexible shaft 31 to a pinion 29 meshing with a corresponding pinion 30, mounted on the crankshaft of the engine. This flexible shaft connection causes the shafts 26 and 25 to be driven in direct ratio to that of the crankshaft and the oscillations of the mirror will also be in direct ratio to the speed of the engine.

From the above description, it is obvious that the mirror 3 is caused to rock about its horizontal axis by the variations of the pressure in the explosion chamber 19 of the engine and that it is caused to rock about a vertical axis by means of mechanism driven in timed relation to the speed of the engine. Therefore, the rays of light reflecting onto the screen 2 will have a combined vertical and horizontal movement which will produce a curve on the screen 2 such as shown in Fig. 5. By determining the correct ratio of the lines of this curve, it is possible to discover any discrepancies in the work of any cylinder.

The shaft 25 is also provided with a worm gear 32 meshing with a wheel 33 which drives a shaft 34 carrying a make and break contact maker 35. Projecting into the path of the contact maker 35 is a pair of stationary contact members 36 and 37, which are connected into the circuits 38 and 39 respectively so as to alternately energize the magnets 41 and 42, and reciprocate the screen 8 by attracting the members 43 and 44, which are mounted upon the opposite side of the screen 8. The reciprocation of the screen 8 will alternately move its opening 7 into and out of registration with a fixed opening 7', thus producing intervals at which the rays of light will be interrupted. This makes it possible to separate on the indicating or recording device, the action which takes place at the different revolutions of the crankshaft.

In employing a device embodying my invention for testing the cylinders of an automobile engine, the flexible shaft is connected into driving engagement with the crankshaft and the conduit 18 is connected into open communication with the explosion chamber 19. The timer 45 is then adjusted to bring the oscillations of the mirror at the desired portion of the engine stroke, and the engine tested either by the operator watching the reflections on the screen 2 or keeping a record of it by using as the screen a sensitive plate. The purpose of this timer is to set the mirror at a given angle relative to the position of the crank. The device is simple in construction and very sensitive in its operations so that the slightest discrepancies in the actions of any of the cylinders can be detected and while I have shown and described the device as adapted for testing an internal combustion engine, it is obvious that it could be used for testing other types of engines. Also the various details of construction can be changed and I therefore do not desire to limit the invention except as specified in the appended claims.

I claim as my invention:

1. In a testing device for engines, the combination with a source of light, of a screen member, a mirror for reflecting the rays from said source of light onto said screen, means for adjusting said mirror in accordance with the pressure in the engine cylinder and means for adjusting the mirror in a different direction simultaneously with its pressure control adjustment comprising a rockable support for the mirror, a shaft from the crankshaft to the engine and eccentric connections between said rockable support and crankshaft.

2. In a testing device for engines, the combination with a mirror for reflecting a ray of light, means for adjusting said mirror in one direction in accordance with the pressure on the engine cylinder, means for adjusting the mirror in a different direction in accordance with the speed of the crankshaft, a source of light for directing rays of light to said mirror, electrical control mechanism for automatically cutting off said rays from the mirror and means for controlling said electrical mechanism from the crankshaft.

3. In a testing device for engines, the combination with a reflector, of a source of light, means for directing rays of light against said reflector, a shutter for intermittently cutting off said rays of light and connections between the crank-shaft and said shutter for actuating the latter in timed relation with the rotation of the crankshaft.

MARTIN L. WILLIAMS.